on each side of the machine and freely rotatable on a single spindle 51, extending through the guards and the draft-bar 47. Each draft-bar 47 has a plurality of serrations on one edge, as at 52, and in a plane between outwardly-projecting bearing-ears 53, in which a serrated clamp 54 is pivotally mounted. A continuous rope or cable 55 of suitable length is threaded around the upper pulleys or sheaves and through the brackets 6 on the jaws 4 in contact with the sheaves or pulleys 7, and one extremity of the said rope or cable 55 passes over the top portion of one side 2 against a direction-spool 56, vertically mounted on said side, and then wound or passed around the spool or reel 17 and secured. Another portion of the said rope or cable from the upper series of the one compound sheave or pulley extends downwardly under the frame of the machine and loosely through guide-eyes 57, depending from the intermediate bearing-strip 14, and from the latter the said rope or cable passes through the compound sheave or pulley at the other side and makes contact with the lowermost pulley or sheave therein and returns through the lower set of brackets 6 on the jaws 5 and against the pulleys or sheaves 7 and then to the lower portion of the compound pulley or sheave on the right of the machine, as shown by Fig. 1, and from the latter under the frame of the machine to the rear extremity of the spool or reel 17 and passed around the latter in a direction opposite to the other extremity heretofore referred to and secured. By arranging the rope or cable in the manner described an equal tension or pulling strain can be equally exerted at opposite sides of the machine, and in primarily arranging the parts of the machine for first drawing the wires together the operation is as follows: The shaft 19 is shifted to the rear and held by means heretofore explained, thus throwing the gear 23 out of mesh with the gears 35 on the heads 34 and connecting the shaft through the clutch mechanism explained with the spool or reel 17. The clamping devices on the draft-bars 47 are then secured or connected to the wire at opposite sides, and the operator firmly grasping the grip 33 and turning the crank-handle 32 will actuate the spool or reel 17, and thereby gradually wind the extremities of the rope or cable 55 in opposite directions on the said spool or reel from the opposite ends toward the center. This will shorten the rope or cable and cause the opposite compound sheaves or pulleys to move equally toward the sides 2 of the machine, and backward movement or slipping of the spool or reel 17 will be prevented by means of the ratchet-teeth 20 and the pawl 22, heretofore set forth. When the wire ends have been taken up or drawn together a sufficient distance, they are arranged in the opposite twisting-heads and connected to the holding devices on the latter, as shown in Fig. 1 and also heretofore particularly referred to. It will be observed that the tension of the wire on opposite sides will not be exerted on the twisting-heads in view of the fact that the compound pulleys on the opposite sides of the machine will be held in their adjusted positions in view of the locked condition of the spool or reel 17, and after the wire ends have been disposed as explained the shaft 19 is shifted forwardly, as shown in Fig. 2, to throw the gear 23 in mesh with the gears 35 and at the same time unlock the spool or reel 17 from operative connection with the said shaft. The shaft will now be free to turn in the spool or reel 17, and by again so operating it the twisting-heads will be rotated in opposite directions and the locking-twist formed between the contiguous wire ends. After completion of the jointure of the wire ends the spliced wire can be quickly removed from the machine or the latter withdrawn, as heretofore specified.

The machine is also adapted to be used in taking up slack in wire runners, and considerable power can be exerted on the runners by a comparatively-small amount of applied operating exertion.

To prevent anything from passing down between the gears, guards 58 are employed and reversely arranged at top and bottom, as clearly shown in Figs. 1 and 3.

To suit different operations, it is proposed to change the form, size, proportion, and minor details of construction; but such changes will be made completely within the scope of the invention.

Having thus described the invention, what is claimed is—

1. In a wire stretching and splicing machine of the character set forth, the combination of a frame having a reel or spool, an operating-shaft shiftable through the said reel or spool and adapted to be clutched thereto and also having a gear thereon, twisting-heads provided with gears to mesh with that on the shaft, compound sheaves or pulleys disposed at opposite sides of the machine, and a continuous rope or cable passing through parts of the machine and the compound sheaves or pulleys and having their extremities connected to opposite portions of the spool or reel for reverse winding on the latter.

2. In a wire stretching and splicing machine of the character set forth, the combination of a frame, twisting-heads rotatably mounted therein and disposed in transverse alinement, wire-holders mounted on the inner opposing faces of the said twisting-heads, a continuous rope or cable, compound sheaves and a spool or reel for drawing the ends of the wire inwardly toward each other, and means for operating the said twisting-heads.

3. In a machine of the character set forth, the combination of a frame having sides with a pair of jaws at each extremity and in alinement, the said jaws having open spaces between them, horizontally-disposed sheaves or pulleys held by the terminal portions of the said jaws, twisting-heads rotatably mounted No. 658,150. Patented Sept. 18, 1900.
H. JACOBS.
WIRE SPLICING MACHINE.
(Application filed July 5, 1900.)
(No Model.)
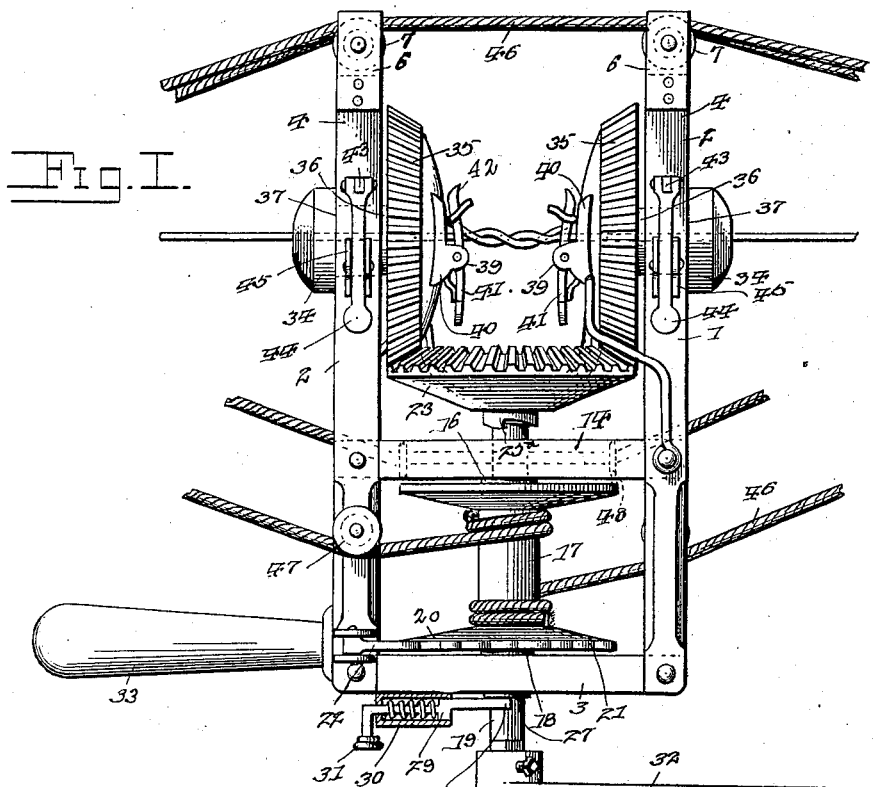
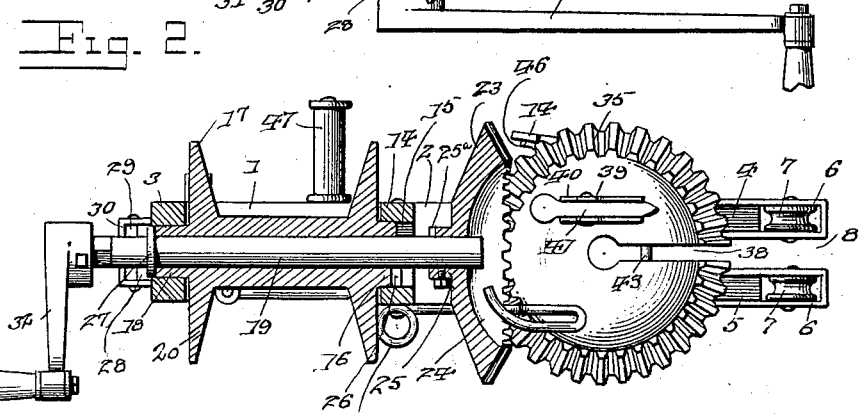
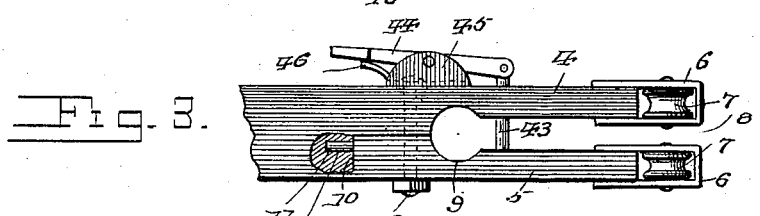
Witnesses
F. E. Alden
Chas. S. Hoyer
Henry Jacobs, Inventor
C. A. Snow & Co.
Attorneys

UNITED STATES PATENT OFFICE.

HENRY JACOBS, OF LEXINGTON, ILLINOIS.

WIRE-SPLICING MACHINE.

SPECIFICATION forming part of Letters Patent No. 658,150, dated September 18, 1900.

Application filed July 5, 1900. Serial No. 22,589. (No model.)

*To all whom it may concern:*

Be it known that I, HENRY JACOBS, a citizen of the United States, residing at Lexington, in the county of McLean and State of Illinois, have invented a new and useful Wire-Twister for Fences, of which the following is a specification.

This invention relates to a machine for repairing wire fences of different types; and the object of the same is to provide simple and effective means for holding wires and by a manual operation facilitate connection of the same, and which can be easily and readily applied without disconnecting the wires from their supports and operative between two of the latter or at any other point along the line of the fence, and it is also capable of use for general coupling operations.

The invention consists in the construction and arrangement of the several parts, which will be more fully hereinafter described and claimed.

In the drawings, Figure 1 is a top plan view of a greater portion of a machine embodying the features of the invention. Fig. 2 is a longitudinal vertical section of the same. Fig. 3 is a side elevation of a portion of the machine.

Similar numerals of reference are employed to indicate corresponding parts in the several views.

The numeral 1 designates a frame comprising opposite sides 2 and an end connecting-strip 3. The free extremities of the sides 2 are each composed of a fixed jaw 4 and a removable jaw 5 in vertical alinement, brackets 6 extending outwardly from the ends of the said jaws and having guide sheaves or pulleys 7 horizontally disposed therein. A throat 8 is formed between the jaws 4 and 5 and is continuous with an open space between the inner opposing sides of the brackets 6, the rear part of the throat merging into or being continuous with an enlarged seat aperture or opening 9, formed in each jaw. The jaw 4 is provided by cutting out the removable jaw 5 or separating a portion of the side 2 in each instance from the remaining part, or the side 2 may be constructed in the first instance with the angular seat 10 to receive the rear end of the jaw 5. The said rear end of each jaw 5 has a dowel-pin 11 thereon to fit in a socket 12 in the lower portion of each side 2, and to firmly hold the jaw 5 in contact with the side 2 and in proper relation to the jaw 4 a bolt 13 is employed and is removable at will. The said bolt 13 extends vertically through the jaws 4 and 5, and by means of this separable construction of the jaw 5 on each side of the machine the mechanism more fully hereinafter set forth can be conveniently mounted in operative position or at any time removed for repair or other purposes.

At a suitable distance from the end strip 3 and secured to the sides 2 is a transverse bearing-strip 14, having an opening 15 through the central portion thereof, in which one hub 16 of a winding spool or reel 17 is loosely mounted, the opposite hub 18 of said spool or reel having loose bearing in the end strip 3. An operating-shaft 19 extends through the hubs 16 and 18 and the intermediate body portion of the spool or reel, the latter being loose on the shaft and having one of its flanges 20 formed with ratchet-teeth 21, which are engaged by a gravity-pawl 22, attached to the rear portion of one of the sides 2 and operating to prevent the reel or spool from rotating or having backward movement during a particular operation, which will be presently set forth. The forward end of the shaft 19 has a face-gear 23 fast thereon, which is provided with a central outer concave recess 24 and a hub 25, the latter being formed with a clutch member 25ª, as clearly shown in Fig. 1. The clutch member 25ª operates and coincides with a corresponding clutch formation 26 on the free end of the hub 16 of the spool or reel. The shaft 19 is freely movable through the spool or reel and has a circumferential flange 27 on its rear portion to coact with the adjacent bifurcated end 28 of a latch 29, which is spring actuated and mounted in a casing 30, as shown by Fig. 1, the outer end of the latch being angularly projected and headed, as at 31, for convenience in operating the same. When the shaft is moved forward in the direction of the jaws 4 and 5, the bifurcated end of the catch will bear against the rear edge of the flange 27, and when said shaft is drawn to the rear the said end 28 will be permitted to bear on the shaft and the front edge of the said flange, and in this po-